(12) United States Patent
Vom et al.

(10) Patent No.: US 8,955,546 B2
(45) Date of Patent: Feb. 17, 2015

(54) BRINE DISCHARGE ASSEMBLY

(75) Inventors: Eduardo Vom, Brunswick East (AU); Richard Allman, Wyndham Vale (AU); Samuel Ross Garland Lanyon, Elwood (AU); Stuart Elliott, Park Orchards (AU)

(73) Assignee: Empire Technology Development LLC, Wilmington, DE (US)

( * ) Notice: Subject to any disclaimer, the term of this patent is extended or adjusted under 35 U.S.C. 154(b) by 553 days.

(21) Appl. No.: 12/886,403

(22) Filed: Sep. 20, 2010

(65) Prior Publication Data

US 2011/0220212 A1    Sep. 15, 2011

(30) Foreign Application Priority Data

Mar. 12, 2010 (AU) .................. 2010200965

(51) Int. Cl.
*C02F 1/44* (2006.01)
*B01D 61/10* (2006.01)
*F16L 41/03* (2006.01)
*C02F 1/00* (2006.01)
*C02F 103/08* (2006.01)

(52) U.S. Cl.
CPC ................ *F16L 41/03* (2013.01); *C02F 1/006* (2013.01); *C02F 1/441* (2013.01); *C02F 2103/08* (2013.01)
USPC ................................ 137/565.33; 210/170.11

(58) Field of Classification Search
USPC ................ 137/565.01, 565.33, 563, 606; 210/170.11
See application file for complete search history.

(56) References Cited

U.S. PATENT DOCUMENTS

| | | | | |
|---|---|---|---|---|
| 3,456,802 A | * | 7/1969 | Cole | ................. 210/170.11 |
| 3,974,654 A | | 8/1976 | Mirto, Jr. | |
| 4,335,576 A | | 6/1982 | Hopfe | |
| 4,391,458 A | * | 7/1983 | Blakeley | ................. 285/112 |
| 4,448,682 A | | 5/1984 | Moritz | |

(Continued)

FOREIGN PATENT DOCUMENTS

| | | |
|---|---|---|
| DE | 20002224 | 5/2000 |
| ES | 2311320 A1 | 2/2009 |

(Continued)

OTHER PUBLICATIONS

Author Unknown, "U.S. Department of Energy-Energy Efficient and Renewable Energy: Energy Savers," http://www.energysavers.gov/renewable_energy, updated Dec. 30, 2008, 1 page.

(Continued)

*Primary Examiner* — Atif Chaudry
(74) *Attorney, Agent, or Firm* — Dorsey & Whitney LLP

(57) ABSTRACT

A brine discharge assembly includes a discharge pipe having a body that defines an interior passage, a pipe inlet, and a pipe outlet spaced from the pipe inlet. The pipe inlet and pipe outlet are able to be in fluid communication with the interior passage, and the pipe is connectable to a source of brine and configured to convey the brine from the pipe inlet to the pipe outlet. The brine discharge assembly also includes a dilution assembly able to be connected to a source of liquid diluent. The dilution assembly includes one or more injectors and one or more ports, and is coupled to the pipe so that the one or more ports are able to be in fluid communication with the interior passage of the pipe intermediate the pipe inlet and pipe outlet. The one or more injectors are configured to inject the liquid diluent into the interior passage of the pipe through the one or more ports.

17 Claims, 2 Drawing Sheets

(56) References Cited

U.S. PATENT DOCUMENTS

| | | | |
|---|---|---|---|
| 5,277,250 | A | 1/1994 | Dela |
| 5,553,456 | A * | 9/1996 | McCormack .................. 62/59 |
| 5,568,781 | A * | 10/1996 | Vaillancourt et al. ........ 114/20.2 |
| 5,727,933 | A * | 3/1998 | Laskaris et al. .................. 418/2 |
| 6,390,870 | B1 | 5/2002 | Hughes et al. |
| 6,543,474 | B2 * | 4/2003 | Fetterman, Jr. ............. 137/493.1 |
| 6,804,962 | B1 * | 10/2004 | Prueitt ......................... 60/641.8 |
| 7,023,104 | B2 * | 4/2006 | Kobashikawa et al. ......... 290/42 |
| 7,485,234 | B2 * | 2/2009 | Max .............................. 210/712 |
| 2002/0014460 | A1 | 2/2002 | McKay |
| 2005/0023224 | A1 * | 2/2005 | Schmitz et al. ............... 210/739 |
| 2008/0017519 | A1 | 1/2008 | Siemer et al. |
| 2008/0053907 | A1 | 3/2008 | Gordon |
| 2010/0116726 | A1 | 5/2010 | Dwek et al. |
| 2010/0270236 | A1 * | 10/2010 | Scialdone .................... 210/636 |

FOREIGN PATENT DOCUMENTS

| | | |
|---|---|---|
| NL | 1035015 C2 | 8/2009 |
| WO | WO 00/07218 A2 | 2/2000 |
| WO | 0070218 A1 | 11/2000 |
| WO | 2008119995 A1 | 10/2008 |

OTHER PUBLICATIONS

Malfeito et al., "Brine Discharge from the Javea Desalination Plant," Desalination, Apr. 2005, vol. 185, pp. 87-94.

Author Unknown, "Solving Our Water Problems-Desalination Using Solar Thermal Power, The Oil Drum: Discussions About Energy and Our Future Australia and New Zealand," May 2, 2008, 24 pages.

Barker et al., "Strategic Environmental Assessment of Bristol Water's Draft Water Resource Plan," Strategic Environmental Assessment Environmental Report, Entec UK Ltd., Apr. 2008, 1-92.

GEI/Bookman Edmonston, "Final Report: Evaluation of Seawater Desalination Projects Proposed for the Moneterey Peninsula," Feb. 20, 2008, 112 pages.

Author Unknown, "Channel Mixer Mixing Solutions" Komax Systems Inc., Mixing by Design, http://www.komax.com/PDF/ChannelMixerBrochure.pdf, accessed Mar. 8, 2011, 1 page.

Author Unknown, "Kenics—Static Mixers", Chemineer Products and Services, http://www.chemineer.com/kenics_products.php, accessed Mar. 8, 2011, 2 pages.

Author Unknown, "Solving Our Water Problems—Desalination Using Solar Thermal Power", The Oil Drum: Discussions About Energy and Our Future Australia and New Zealand, May 2, 2008, 24 pages.

Author Unknown, "U.S. Department of Energy-Efficient and Renewable Energy: Energy Savers", http://www.energysavers.gov/renewableenergy, updated Dec. 30, 2008., 1 page.

Hettler, "Open Seawater system with Controlled Temperature and Salinity" The Progressive Fish-Culturist, Jan. 1971, 33(1) 3-11.

Kumar, "Performance of kenics static mixer over a wide range of Reynolds number" Chemical Engineering Journal, Elsevier Science SA, 2008, 139(2) 284-295.

Malfeito et al., "Brine Discharge from the Javea Desalination Plant", Desalination, Apr. 2005, vol. 185 pp. 87-94.

PCT Application No. PCT/SG2010/000302, International Search Report, Filing date, Aug. 17, 2010, Mailing Date Oct. 25, 2010, 9 pages.

Talavera, "Identification of the mixing processes in brine discharges carried out in Barranco del Toro beach, south of Gran Canaria (Canary Islands)", Desalination, Sep. 20, 2001, 139(1-3), 277-286.

Thakur et al, "Static Mixers in the Process Industries—A Review," Chemical Engineering Research and Design, Aug. 2003, 81 (Part A) 787-826.

Author Unknown, Komax Systems Inc., http://www.komax.com/, accessed Nov. 3, 2010, 1 page.

* cited by examiner

BRINE DISCHARGE ASSEMBLY

CROSS-REFERENCE

This application claims priority to Australian application No. 2010200965, filed Mar. 12, 2010, currently pending, entitled "BRINE DISCHARGE ASSEMBLY," which is hereby incorporated by reference in its entirety.

TECHNICAL FIELD

This disclosure relates generally to brine discharge assemblies and to corresponding techniques for diluting brine before disposal.

BACKGROUND

Brine is a concentrated salt solution (usually sodium chloride), which is used for preserving various foodstuffs, as well as in the refrigerant industry. Brine is also a by-product of some seawater desalination plants. However, the disposal of brine can be problematic. For example, the density of brine is greater than typical seawater, and if it was discharged into the sea, it would tend to sink towards the seabed and not disperse throughout the water column. This can result in a hypersaline layer of water forming on the seabed, which could damage sea habitats and organisms.

SUMMARY

In one embodiment, a brine discharge assembly includes a discharge pipe having a body that defines an interior passage, a pipe inlet, and a pipe outlet spaced from the pipe inlet. The pipe inlet and pipe outlet are able to be in fluid communication with the interior passage, and the pipe is connectable to a source of brine and configured to convey the brine from the pipe inlet to the pipe outlet. The brine discharge assembly also includes a dilution assembly able to be connected to a source of liquid diluent. The dilution assembly includes one or more injectors and one or more ports, and is coupled to the pipe so that the one or more ports are able to be in fluid communication with the interior passage of the pipe intermediate the pipe inlet and pipe outlet. The one or more injectors are configured to inject the liquid diluent into the interior passage of the pipe through the one or more ports.

In another embodiment, a dilution assembly is adapted to be coupled to a pipe for discharging brine. The dilution assembly includes a liquid inlet adapted to be connected to a source of a liquid diluent, one or more injectors, and one or more ports. The dilution assembly can be coupled to the pipe so that the one or more ports are capable of being in fluid communication with an interior passage of the pipe intermediate a pipe inlet and a pipe outlet. The one or more injectors are configured to inject the liquid diluent into the interior passage of the pipe through the one or more ports.

In another embodiment, a method for diluting brine before it is discharged into a body of water includes causing the brine to flow through a pipe, introducing a liquid that dilutes the brine at a plurality of locations along the pipe, and discharging the diluted brine into the body of water.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF ILLUSTRATIVE EMBODIMENTS

Figure 1:
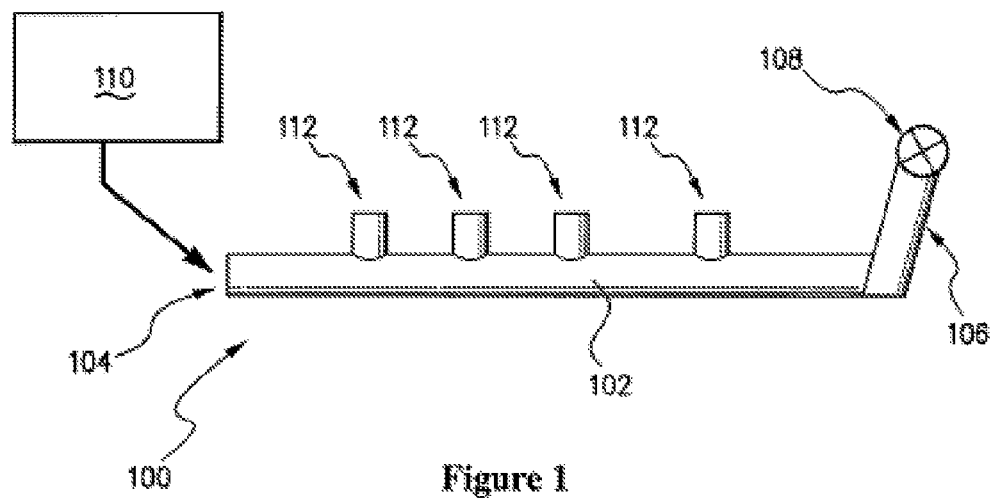
FIG. 1 shows a schematic of an illustrative embodiment of a brine discharge assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is directed generally to a brine discharge assemblies and corresponding techniques for diluting brine before it is disposed. Brine is a by-product of the reverse osmosis systems used in many seawater desalination plants. In coastal areas, the brine by-product of such plants is often simply discharged back into the sea. As noted above, however, the disposal of brine into the sea can be problematic. As brine contains roughly twice the concentration of salt than seawater, it is denser than seawater and, instead of rising and dispersing in the seawater after disposal, it sinks towards the seabed. This can result in hypersaline layers of water on the seabed around the brine outlet, and have significant environmental consequences.

Disclosed in one embodiment is a brine discharge assembly. The brine discharge assembly includes a discharge pipe having a body that defines an interior passage, a pipe inlet, and a pipe outlet spaced from the pipe inlet. The pipe inlet and pipe outlet are able to be in fluid communication with the interior passage, and the pipe is connectable to a source of brine and configured to convey the brine from the pipe inlet to the pipe outlet. The brine discharge assembly also includes a dilution assembly able to be connected to a source of liquid diluent. The dilution assembly includes one or more injectors and one or more ports, and is coupled to the pipe so that the one or more ports are able to be in fluid communication with the interior passage of the pipe intermediate the pipe inlet and pipe outlet. The one or more injectors are configured to inject the liquid diluent into the interior passage of the pipe through the one or more ports.

The brine discharge assembly can be used to dilute brine as it flows through the discharge pipe before it is disposed. The provision of one or more injectors and one or more ports in the assembly enables the diluent to be effectively mixed with the brine before the diluted brine is discharged. Thus, if the brine discharge assembly is used to discharge brine from a desalination plant into the sea, the diluted brine would be more likely to disperse in the seawater after disposal.

In some embodiments, the dilution assembly includes a plurality of the injectors, the injectors being discrete from one another.

In some embodiments, at least one of the one or more injectors is in fluid communication with only one port.

In some embodiments, at least one of the one or more injectors includes a pump that can pump the liquid diluent into the interior passage of the pipe through at least one of the one or more ports. In some embodiments, the pump may have an adjustable flow rate. In some embodiments, the pump may be operated using wave power.

In some embodiments, at least one of the one or more injectors includes a check valve.

In some embodiments, at least one of the one or more injectors includes a diffuser.

In some embodiments, the brine discharge assembly also has a pipe outlet diffuser at the outlet of the discharge pipe.

In some embodiments, the liquid diluent is seawater. In such embodiments, the source of the seawater may, for example, be a body of water in which the outlet of the discharge pipe is submerged.

One of the many benefits is that seawater may be used as a diluent if the brine is to be disposed in coastal areas. This is because seawater is in plentiful supply and is unlikely to introduce any potential contaminants into the system. Further, if the seawater is taken from the body of water in which the outlet of the discharge pipe is submerged, then the diluted brine that is discharged from the pipe will not only be less saline, but its temperature is more likely to be similar to the temperature of the seawater around the pipe outlet. As those skilled in the art will appreciate, temperature can also affect the density of seawater, and some stratification of the diluted brine might still occur if the temperature difference was significant.

An illustrative embodiment of a brine discharge assembly will now be described. FIG. 1 shows a schematic of an illustrative embodiment of a brine discharge assembly 100. As depicted, the assembly 100 may be located underwater and includes a pipe 102 with an inlet 104 and an outlet 106. The inlet 104 is adapted to receive a flow of brine by-product from a desalination plant 110. The outlet 106 includes a diffuser 108, which causes the diluted brine that flows out of the outlet 106 to be more effectively dispersed with the seawater around the outlet 106 (e.g., the diffuser 108 increases the pressure of the brine entering the seawater, hence allowing the brine to mix with a larger volume of seawater).

In this illustrative embodiment, the assembly 100 is shown in the form of a wholly underwater assembly. It will be appreciated, however, that part (or all) of the assembly 100 could readily be located above ground, for example, the inlet 104 could be located at the desalination plant 110 itself.

Located at spaced intervals between the inlet 104 and the outlet 106 of the pipe 102 are a number of discrete injectors in the form of intake assemblies 112. The intake assemblies 112 are adapted to receive an intake of liquid diluent in the form of seawater, either because they are submersed underwater (as shown), or are otherwise coupled to a source of seawater (e.g., via a length of pipe). Alternatively, some (or all) of the intake assemblies 112 may be adapted to receive an intake of another liquid diluent (e.g., waste water or fresh water). Each intake assembly 112 is coupled to the pipe 102 via a port, which enables fluid communication between the intake assembly 112 and the interior of the pipe 102. Thus, seawater that is sucked into one of the intake assemblies 112 can be injected into the pipe 102 to dilute the brine.

The intake assemblies 112 can be coupled to the pipe 102 in any manner known to those skilled in the art. For example, the intake assemblies 112 can be tapped into the pipe 102, or comprise a sleeve (described below) into which respective ends of adjacent pipes in a pipeline can be received.

As will be appreciated, each intake assembly 112 need not be discrete from one another and could, for example, have one intake that injects the seawater into two (or more) separate locations along the length of the pipe 102. In some embodiments, for example, a brine discharge assembly could be provided having a dilution assembly in the form of a manifold, having one inlet and a number of outlets that are spaced along the pipe and through which the liquid diluent can be added to and mixed with the flow of brine in the pipe. In some embodiments, the assembly 100 may have only one intake assembly 112.

The internal structure of the intake assemblies 112 will be described in further detail below in the context of a dilution assembly.

Disclosed in another embodiment is a dilution assembly. The dilution assembly is adapted to be coupled to a pipe for discharging brine. The dilution assembly includes a liquid inlet adapted to be connected to a source of a liquid diluent, one or more injectors, and one or more ports. The dilution assembly can be coupled to the pipe so that the one or more ports are capable of being in fluid communication with an interior passage of the pipe intermediate a pipe inlet and a pipe outlet. The one or more injectors are configured to inject the liquid diluent into the interior passage of the pipe through the one or more ports.

As will be appreciated, such a dilution assembly may be provided in a modular form, and thus be used to provide a dilution assembly on an existing pipe or pipeline.

In some embodiments, at least one of the one or more injectors is adapted to be tapped into the pipe for discharging brine.

In other embodiments, at least one of the one or more injectors has a sleeve adapted to receive therein respective ends of adjacent pipes.

In some embodiments, at least one of the one or more injectors is in fluid communication with only one port.

In some embodiments, at least one of the one or more injectors includes a check valve.

In some embodiments, at least one of the one or more injectors includes a diffuser.

In some embodiments, at least one of the one or more injectors includes a pump for pumping the liquid diluent into the pipe.

Figure 2:
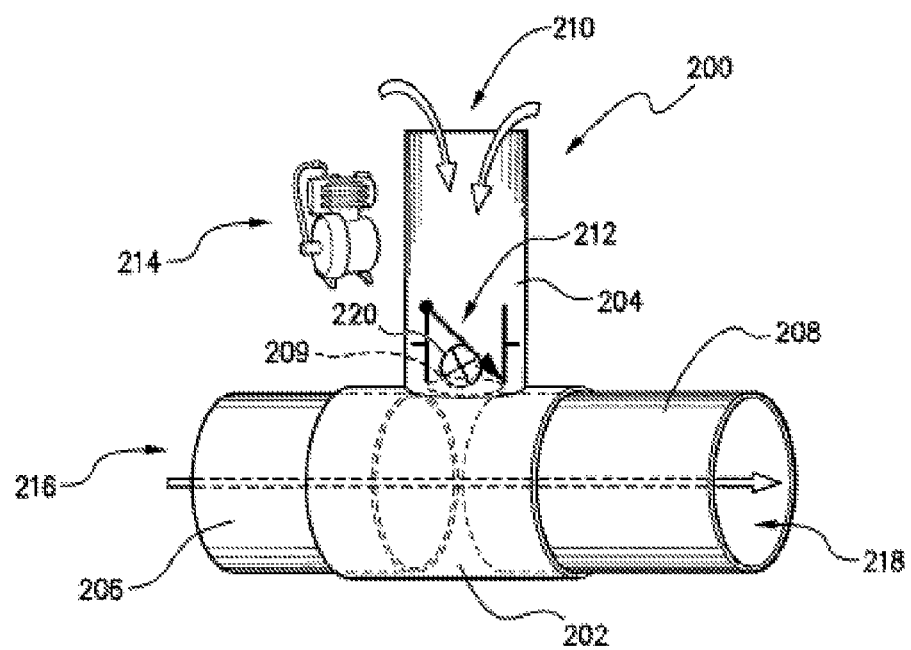
FIG. 2 shows schematic of an illustrative embodiment of a dilution assembly.

An illustrative embodiment of a dilution assembly will now be described. FIG. 2 shows a schematic of an illustrative embodiment of a dilution assembly 200. As depicted, the dilution assembly 200 includes a sleeve 202 and a housing 204. The sleeve 202 is adapted to receive therein respective ends of adjacent pipes 206 and 208, which together (and possibly with other lengths of pipe) define a pipeline for discharging brine. The ends of the pipes 206 and 208 located within the sleeve 202 do not abut each other (i.e., are not joined), but a gap is provided therebetween. The dilution assembly 200 includes a port 209 located proximate to the housing 204, and which defines a liquid diluent flow pathway from the housing 204, through the port 209, into the gap between the pipes 206 and 208 and hence the interior passage of the pipeline.

It will be appreciated that the dilution assembly generally disclosed herein could be coupled to a pipe for discharging brine in other ways, such as by being directly tapped into the pipe.

The housing 204 has a liquid inlet in the form of a diluent intake 210 which, in this illustrative embodiment, is simply an opening through which seawater can enter the housing 204, for example, once the pipeline is located underwater. In alternate embodiments, the liquid inlet may be adapted to be attached to a hose, or the like, through which a liquid diluent can flow into the housing. The housing 204 also includes a check valve 212, which can control the flow or communication of liquid from within the housing 204 to the dilution assembly 200. Once the dilution assembly 200 is coupled to the pipes 206 and 208, the check valve 212 is operable to allow seawater in the housing 204 to be injected or otherwise flow into the pipes 206 and 208, but not to allow any fluid in the pipes 206 and 208 (e.g., brine) to flow into the housing 204.

The housing 204 also includes a pump 214 (which, for simplicity, is depicted as being located outside of the housing), which can be operated to pump the seawater that has entered the housing 204 via the diluent intake 210 through the check valve 212, and into the pipeline at the junction of pipes 206 and 208. The seawater pumped into the pipeline can then mix with a flow of brine in the pipeline, and dilute the brine.

It will be appreciated that a pump may not even be necessary in some embodiments. For example, if the dilution assembly 200 were situated in deep seawater, the injector may utilize the pressure of the seawater to inject the seawater into the interior passage of the pipe.

The pump 214 may provide an adjustable flow rate thus allowing a user the ability to adjust the amount of diluent being added, and thus optimize the ratio of diluent to brine for a particular set of circumstances.

A diffuser 220 may also be provided between the check valve 212 and the port 209 to facilitate a more turbulent mixing of seawater/brine at the junction of pipes 206 and 208.

Although not depicted in FIG. 2, those skilled in the art will appreciate that the housing 204 may include other features in order to house the pump in a suitable environment. It is envisaged that the housing 204 include at least one airtight chamber in which the pump 214 is located, as well as a number of watertight ports through which a source of electricity can be provided to drive the pumps (e.g., via a power cord).

It is also envisaged that the pump 214 could be powered by other means. For example, the pump 214 could be powered by wave generated power. Alternatively, the pump 214 could be a wave powered pump of the type disclosed WO 2000/070218 (the specification for international (PCT) application no. PCT/IB00/00627), the contents of which are incorporated by reference herein in its entirety.

In one illustrative embodiment, a solution of brine may flow from a desalination plant (not shown) into an inlet 216 defined by the distal end of the pipe 206. As the brine passes through the junction of the pipes 206 and 208, seawater is pumped into the pipes 206 and 208 via the dilution assembly 200, thus diluting the brine. The diluted brine then continues to flow towards an outlet 218 defined by the distal end of the pipe 208, where it is discharged into the ocean. As will be appreciated, in this embodiment, the pipeline includes only the pipes 206 and 208. In other embodiments, however, the pipeline may include many more pipes (i.e., additional pipes) and, optionally, additional dilution assemblies 200.

The intake assemblies 112 described above in the context of the illustrative embodiment of the brine discharge assembly 100 may be, in some embodiments, the same as the dilution assembly 200 described above.

Figure 3:
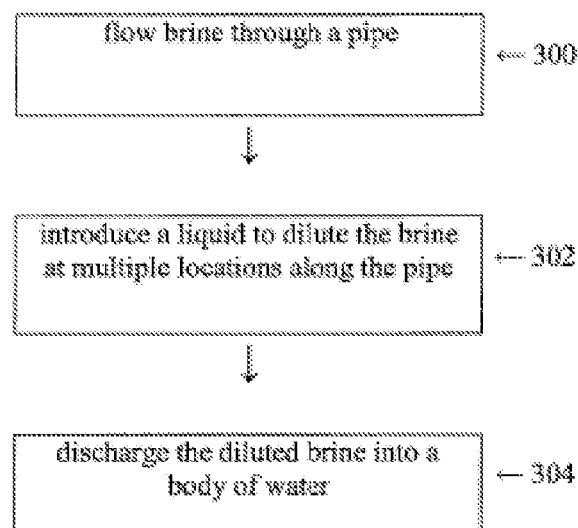
FIG. 3 shows a flow diagram of an illustrative embodiment of a method for diluting brine before discharge into a body of water.

Also disclosed in some embodiments is a method for diluting brine before it is discharged into a body of water. FIG. 3 shows a flow diagram of an illustrative embodiment of a method for diluting brine before discharge into a body of water. In block 300 (flow brine through a pipe), the brine is introduced into and caused to flow through a pipe, for example, the pipe 102. In block 302 (introduce a liquid to dilute the brine at multiple locations along the pipe), liquid is introduced into the pipe at multiple locations along the pipe. By way of example, the liquid may be introduced into the pipe 102 via intake assemblies, such as the intake assemblies 112. The liquid mixes with and dilutes the brine that is flowing through the pipe 102. In block 304 (discharge the diluted brine into a body of water), the diluted brine is discharged into a body of water.

In some embodiments, the liquid that dilutes the brine is water taken from the body of water. In some embodiments, the body of water is seawater.

Figure 4:
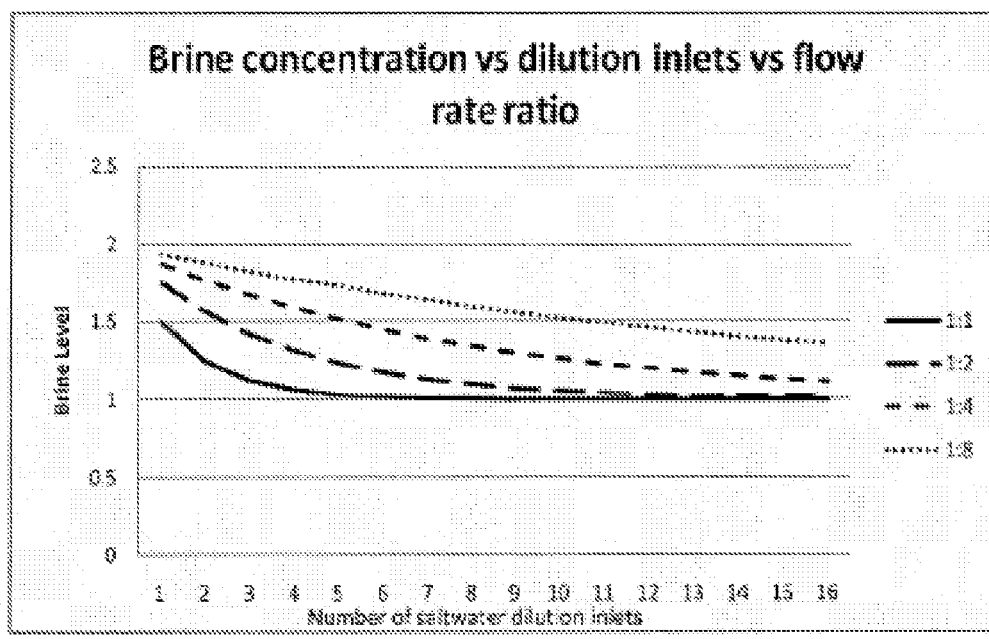
FIG. 4 shows graph of brine concentration versus dilution inlets versus flow rate ratio of diluent to brine.

In an illustrative embodiment of the method disclosed herein, brine is diluted before it is disposed into the sea. In an illustrative embodiment, fresh seawater is introduced into a brine discharge pipe at different intervals in order to dilute the brine and equalize the temperature. The dilution factor will be controlled by the number of seawater dilution inlets attached to the pipe and the flow rate of the fresh seawater. In this respect, FIG. 4 shows graph of brine concentration versus dilution inlets versus flow rate ratio of the seawater diluent to the brine through each of the dilution inlets. The data shown in FIG. 4 is based on numerical calculations and the assumption that the starting concentration of the brine from a desalination plant is typically 2 times that of seawater (approximately 75 parts per thousand (ppt) in brine and 35-36 ppt in seawater).

As can be seen from the graph, increasing the number of seawater dilution inlets along a length of pipe causes the brine level to drop from an initial concentration of 2 times that of seawater towards a concentration of 1 (i.e., the concentration of salt in seawater). The ratio of fresh seawater being mixed with the flow of brine at each seawater dilution inlet also dramatically affects the rate at which the brine is diluted.

It is within the ability of those skilled in the art to determine the appropriate number of seawater dilution inlets and flow rate ratio of fresh seawater to brine through those inlets, given the properties of a particular solution of brine, length of pipe, salinity of seawater at the disposal site, the pump capacity, etc.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed:

1. A brine discharge assembly, comprising:
   a discharge pipe comprising a body defining an interior passage, a pipe inlet, and a pipe outlet spaced from the pipe inlet, the pipe inlet and pipe outlet able to be in fluid communication with the interior passage, the pipe inlet being connectable to a source of brine, the discharge pipe configured to convey the brine from the pipe inlet to the pipe outlet, and the pipe outlet being configured to discharge the brine into a source of liquid diluent; and
   a dilution assembly configured to be connected to the source of liquid diluent and a source of another liquid diluent, the dilution assembly having a plurality of injectors and a plurality of ports, the dilution assembly being coupled to the pipe so that the plurality of ports are configured to be in fluid communication with the interior passage of the pipe intermediate the pipe inlet and pipe outlet, the plurality of injectors being configured to inject liquid diluent from the source of liquid diluent and the another liquid diluent into the brine in the interior passage of the pipe through the plurality of ports;

wherein the pipe outlet and at least one of the plurality of injectors are submerged in the source of liquid diluent.

2. The brine discharge assembly of claim 1, wherein the plurality of injectors are discrete from one another.

3. The brine discharge assembly of claim 1, wherein at least one of the plurality of injectors is in fluid communication with only one port.

4. The brine discharge assembly of claim 1, wherein at least one of the plurality of injectors comprises a pump that is operable to pump the liquid diluent into the interior passage of the pipe through at least one of the plurality of ports.

5. The brine discharge assembly of claim 4, wherein the pump has an adjustable flow rate.

6. The brine discharge assembly of claim 4, wherein the pump is operable using wave power.

7. The brine discharge assembly of claim 1, wherein at least one of the plurality of injectors comprises a check valve.

8. The brine discharge assembly of claim 1, wherein at least one of the plurality of injectors comprises a diffuser.

9. The brine discharge assembly of claim 1, further comprising a pipe outlet diffuser at the outlet of the discharge pipe.

10. The brine discharge assembly of any of claim 1, wherein the liquid diluent is seawater.

11. A dilution assembly adapted to be coupled to a pipe for discharging brine, the assembly comprising:
    a liquid inlet configured to be submerged in a source of a liquid diluent;
    a plurality of injectors, at least one of the plurality of injectors configured to be submerged in the source of a liquid diluent and at least another of the plurality of injectors configured to be coupled to another source of another liquid diluent, one or more of the plurality of injectors including a check valve and a diffuser; and
    one or more ports;
    wherein the dilution assembly is coupleable to the pipe so that the one or more ports are capable of being in fluid communication with an interior passage of the pipe intermediate a pipe inlet and a pipe outlet, the one or more plurality of injectors being configured to inject the liquid diluent from the source of the liquid diluent and the another liquid diluent from the another source of the another diluent into brine in the interior passage of the pipe through the one or more ports, the diffuser being positioned between the check valve and the port in the at least one of the one or more plurality of injectors, the pipe outlet being configured to discharge the brine with the liquid diluent and the another liquid diluent into the source of the liquid diluent.

12. The dilution assembly of claim 11, wherein the at least one of the plurality of injectors is adapted to be tapped into the pipe for discharging brine.

13. The dilution assembly of claim 11, wherein the at least one of the plurality of injectors comprises a sleeve adapted to receive therein respective ends of adjacent pipes.

14. The dilution assembly of claim 11, wherein the at least one of the plurality of injectors is in fluid communication with only one port.

15. The dilution assembly of any one of claim 11, wherein the at least one of the plurality of injectors comprises a pump operable in use to pump the liquid diluent into the pipe.

16. A method for diluting brine before it is discharged into a body of water, the method comprising:
    causing the brine to flow through a pipe, wherein at least a portion of the pipe comprising an outlet of the pipe is configured to be submerged in the body of water;
    injecting a first liquid from the body of water into the brine in the pipe using at least one of a plurality of injectors at a plurality of locations along the pipe, the injected liquid diluting the brine;
    injecting a second liquid from a second liquid diluent source into the pipe using at least one of the plurality of injectors at a plurality of locations along the pipe, the injected second liquid from the second liquid diluent source diluting the brine;
    wherein at least one of the plurality of injectors is configured to be submerged in the body of water; and
    discharging the diluted brine into the body of water via the outlet of the pipe.

17. The method of claim 16, wherein the body of water is seawater.

* * * * *

UNITED STATES PATENT AND TRADEMARK OFFICE
CERTIFICATE OF CORRECTION

Page 1 of 1

PATENT NO.        : 8,955,546 B2
APPLICATION NO.   : 12/886403
DATED             : February 17, 2015
INVENTOR(S)       : Vom et al.

It is certified that error appears in the above-identified patent and that said Letters Patent is hereby corrected as shown below:

On Title Page 2, Item (56), under "OTHER PUBLICATIONS", in Column 2, Line 2, delete "Moneterey" and insert -- Monterey --, therefor.

In the Claims,

In Column 9, Line 29, in Claim 10, delete "any of claim" and insert -- claim --, therefor.

In Column 10, Line 21, in Claim 15, delete "any one of claim" and insert -- claim --, therefor.

Signed and Sealed this
Thirtieth Day of June, 2015

Michelle K. Lee
*Director of the United States Patent and Trademark Office*